Sept. 13, 1949.  E. C. SLAUGHTER  2,481,956
ELECTRIC MOTOR PROTECTIVE CIRCUIT CONTROL
Filed Aug. 2, 1946  2 Sheets-Sheet 1
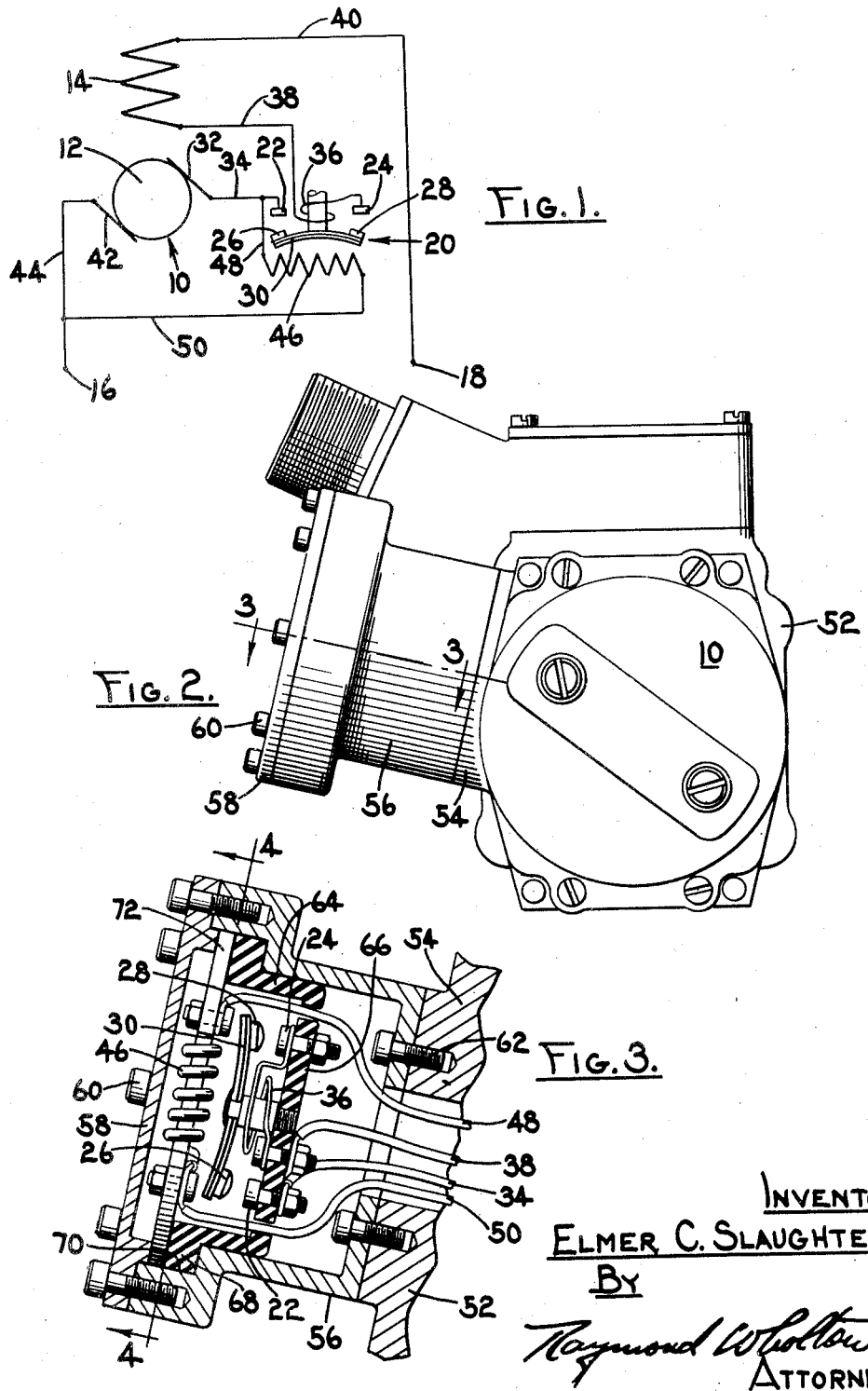
INVENTOR
ELMER C. SLAUGHTER
BY
Raymond W. Colton
ATTORNEY Sept. 13, 1949.   E. C. SLAUGHTER   2,481,956
ELECTRIC MOTOR PROTECTIVE CIRCUIT CONTROL Filed Aug. 2, 1946   2 Sheets-Sheet 2

INVENTOR
ELMER C. SLAUGHTER
BY
Raymond W. Colton
ATTORNEY

Patented Sept. 13, 1949

2,481,956

UNITED STATES PATENT OFFICE

2,481,956

ELECTRIC MOTOR PROTECTIVE CIRCUIT CONTROL

Elmer C. Slaughter, Grand Rapids, Mich., assignor to Lear, Inc., Grand Rapids, Mich., a corporation of Illinois Application August 2, 1946, Serial No. 688,155

4 Claims. (Cl. 318—558)

1

This invention relates to electrical machinery and to circuit controlling means therefor.

An important application of the invention is in the protection of such machinery against undue temperature rise due to overloading and against either the thermal or mechanical effects of over-speeding, the purpose of this type of equipment being to allow a machine to run as long as possible under a given load without overheating.

In the past, several systems have been used in the design of this type of protective equipment, most of them being based upon the effect of temperature on a thermal switch which thus controls the flow of the current with respect to such machinery. Such thermal switches conventionally responding to an electric heater in series with the load current of the machine being protected, and to conducted heat from the machine itself, usually protect the machine only while it is operated within its normal operating range of speeds and loads. With such known arrangements it is generally recognized that some special provision must be made for protecting the motor against surges of current when the armature is stalled and the amount of conducted heat is small, as in starting under overloaded conditions. This added provision has usually consisted of an auxiliary circuit for energizing a second heater thermally associated with the same switch, the auxiliary circuit being frequently inactivated centrifugally when the motor reaches its operating range as exemplified by the disclosure of the U. S. Patent to Johns, No. 2,338,515, dated January 4, 1944. It has further been proposed to regulate the temperature of the thermal switch within the operating range of the motor, by a balance between the heat supplied by the heating element and the heat lost through radiation and the cooling effect of air passing through the mechanism at a known or controlled rate.

In these known systems of motor protection it is difficult to combine in one unit a satisfactory degree of protection at both low and high load, due to the fact that in the conventional thermal switch, the load current heater is adjusted for proper performance at a definite load. At a load less than this, the heater cannot be depended upon to operate the thermal switch in sufficient time to protect the motor, even with the help of heat conducted from the motor itself. This is particularly true in the case of motors subject to intermittent duty at relatively high frequency in which limiting temperatures may be reached in the windings before any appreciable amount of heat is conducted from the motor itself. If the heater and thermal switch are designed to protect adequately against heat due to motor losses at light load, some desirable performance features of the motor are likely to be sacrificed due to oversensitivity of the controller at higher loads. It is further seen that any mechanism which relies on heat gathered from or lost to the motor itself requires that the protecting unit be attached to or closely associated with the motor it is protecting. This fact in many cases seriously limits the installation of electric motors when space available is at a premium.

These limitations of the prior art have been overcome in accordance with the present invention by providing a circuit for an electrical machine including a thermal switch and a heater therefor energized as a direct function of the speed of the machine rotor. Such heater means is preferably energized at all operating conditions of the machine, which may be accomplished by connecting it in shunt relationship with the rotor. The switch is preferably energized also as a direct function of the load on the machine, which may be effected by providing another heater in series with the load circuit of the machine. This arrangement is particularly well adapted for protecting motors, and while a series motor has been illustrated in the drawings, other applications will occur to those skilled in the art. Where the switch is located in thermally conductive relationship with respect to the machine, it will take into account the heating effects due to losses as well, but it is likewise contemplated that the protective apparatus can be thermally isolated from the machine for protection without reference to the heat losses.

A more complete understanding of this invention may be obtained by reference to the accompanying drawings wherein:

Fig. 1 is a circuit diagram showing an application of the invention;

Fig. 2 is an end elevation of an electric motor to which the controlling mechanism is attached;

Fig. 3 is a sectional elevation taken along line 3—3 of Fig. 2;

Figure 4:
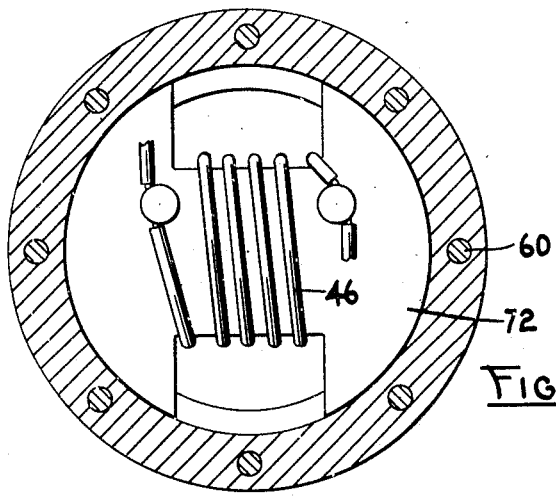
Fig. 4 is a section taken along line 4—4 of Fig. 3.

Referring to Fig. 1 of the drawing, a motor 10 is provided with a wound rotor 12 and a field or stator winding 14 connected in series relationship with a pair of line terminals 16 and 18. Interposed between the stator and rotor windings, there is provided a thermal switch 20 having relatively fixed contacts 22 and 24 cooperating with a pair of relatively movable contacts 26 and 28 respectively, the positions of which are determined by the position assumed by a heat responsive element 30 illustrated as of the bimetallic type having a snap action. The contact 22 is connected to one of the motor brushes 32 through a lead 34. Contact 24 is connected to one side of the stator winding through a heater element 36 positioned to influence the thermal element, and a lead 38. The other side of the stator winding is connected to the line terminal 18 through a lead 40. The other line terminal 16 is connected to the second brush 42 of the rotor through a lead 44. The thermal switch is also provided with a heater element 46 connected in shunt relationship with respect to the rotor windings through leads 48 and 50.

Under conditions favorable to operation of the motor, the contacts of the thermal switch 20 will be closed so that when the system is energized from the line, current will flow from the line terminal 16 through the rotor winding, switch contacts 22, 26, 28 and 24, through the heater element 36 and stator winding 14 to line through the lead 40 and line terminal 18. Under such starting conditions, should the load imposed upon the motor be excessive with respect to that for which it has been designed, the load current will likewise be excessive with the result that the heater element 36 will raise the temperature of the thermal element 30 to such a point that it will snap to a circuit breaking position like that depicted in Fig. 1. Assuming that the load was not excessive at starting, the heat given off by the heater element 36 will be insufficient to cause flexure of the thermal element and the motor will assume its load. Should the motor encounter an overload condition at any speed, somewhat similar effects will be produced to those just described, the point of opening of the switch however being determined in some measure by the time during which the overload condition persists. In other words, a light overload for a relatively brief period will not raise the temperature of the thermal element sufficiently to cause it to open the circuit at once. However, should the overload condition be maintained for a sufficiently extended period, the heat given off by the heater element 36 will ultimately cause the temperature of the thermal element to rise to a point at which it will open the circuit.

The heater element 46 has a minimum current passing therethrough prior to the time that the rotor actually begins to rotate. Thus at starting, its heating effects upon the heat-responsive element 30 is at a minimum. As the rotor speed is built up however, the voltage drop across the rotor increases with a corresponding increase in current passing through the heater element 46. Accordingly, at higher speeds, the heater element 46 begins to contribute appreciably to the operation of the thermal switch, until ultimately, at sufficient predetermined condiions of over-speeding of the rotor, its influence will be paramount in causing the switch to open. Needless to say, the two heater elements will jointly contribute to the operation of the switch at any condition of operation, and by properly selecting their values to conform with the desired operating characteristics of the motor, operation can be controlled within very close values to obtain the maximum performance from the motor with a minimum danger of damaging it.

Fig. 2 depicts structurally one arrangement contemplate for combining such protective equipment in thermally conductive relationship with a motor. The motor 10 is provided with a housing 52 having a flange 54 which serves as a seat for one end of a switch housing 56 containing protective elements and connections of the type already described. The switch housing is provided with a cover plate 58 which is fastened thereto by means of suitable screws 60 or the like.

As shown in Fig. 3, the switch housing 56 is attached to the motor housing 52 by a suitable number of screws 62 or the like. An insulating substantially cup shaped member 64 is provided with a base 66 for suitably supporting the thermal element 30 and its heater element 36, and likewise constitutes a terminal block for certain of the leads. This member is provided with a flange 68 received in a counterbore 70 formed in the switch housing in which it is held by the pressure of the cover plate 58 transmitted through a supporting disc 72. The supporting disc 72 is employed for mounting the heater element 46 and its terminals for the leads 48 and 50.

From the manner in which the switch housing is mounted with respect to the motor housing, it will be clear that the thermal element 30 will be under the influence not only of the heater elements 36 and 46, but likewise will be affected by heat transmitted in any manner from the motor housing due to frictional losses, hysteresis, eddy currents and the like.

Figure 5:
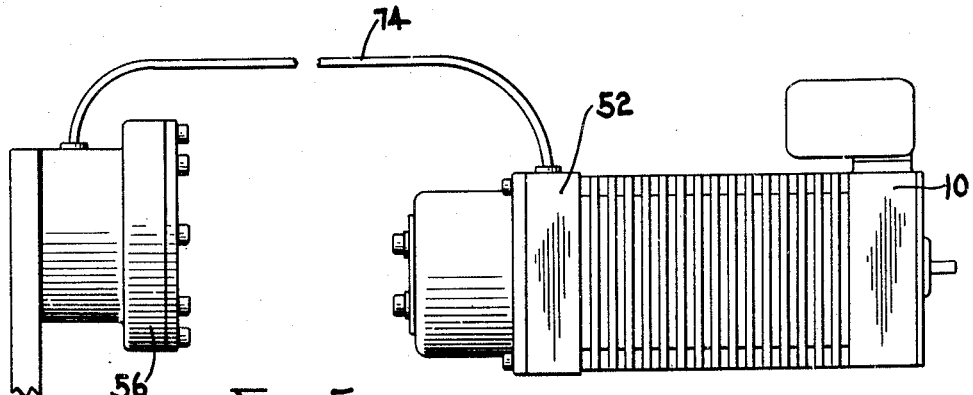
Fig. 5 is an elevation depicting a modification.

In the form of the invention depicted in Fig. 5 of the drawings, the switch housing 56 is thermally isolated from the motor housing 52, communicating therewith only by a cable 74 containing the required leads corresponding with those described with reference to Fig. 3. In this case, the thermal switch will be influenced by heater elements 36 and 46 as before, but the temperature of the motor itself will not participate in the operation of the switch.

Whereas only two forms of structure embodying the invention have been illustrated in the drawings, the invention is susceptible to many other applications. Accordingly, the forms illustrated are to be construed as examples which do not limit the scope of the invention beyond that of the appended claims.

I claim:

1. In combination with an electric motor having a rotor, a source of electric power, a circuit connecting said source to said rotor including a thermal switch, first heater means having a continuous shunt connection with respect to said rotor for actuating said switch, and second heater means arranged to be placed in series connection with said rotor upon closure of said switch, said switch being under the control of either of said heaters.

2. In combination with a series electric motor having armature and field windings, a circuit for said motor including a thermally actuated protective switch in series with said windings, heater means for said switch connected in shunt relationship with said armature winding, and heater means for said switch connected in series relationship with said windings.

3. In combination with an electric motor having a wound armature and a field winding, said windings being interactive during all running conditions of the motor, a device for protecting the motor against excessive current due to overload and against overspeed comprising a thermally responsive element including circuit opening and closing means, and a pair of resistance heaters in heating relation with said element, one of said heaters being connected in shunt with the armature and the other thereof being connected in series with the field winding, said means being interposed in series with the field and armature.

4. In combination with an electric motor having a wound armature and a field winding in series therewith, said windings being interactive during all running conditions of the motor, a device for protecting the motor against excessive current due to overload and against overspeed comprising a thermally responsive element including means for opening and closing the connection between the field and armature, and a pair of resistance heaters in heating relation with said element, one of said heaters being connected in shunt with the armature and the other thereof being connected in series with the field winding.

ELMER C. SLAUGHTER.

REFERENCES CITED

The following references are of record in the file of this patent:

UNITED STATES PATENTS

| Number | Name | Date |
| --- | --- | --- |
| 1,016,661 | Wilkinson | Feb. 6, 1912 |
| 1,987,725 | Veinott | Jan. 15, 1935 |
| 1,999,303 | Sarbey | Apr. 30, 1935 |
| 2,246,516 | Herzog | June 24, 1941 |
| 2,306,810 | Jones | Dec. 29, 1942 |
| 2,318,076 | Johns | May 4, 1943 |
| 2,338,515 | Johns | Jan. 4, 1944 |

FOREIGN PATENTS

| Number | Country | Date |
| --- | --- | --- |
| 622,521 | Germany | Nov. 29, 1935 |